Nov. 25, 1952     O. A. COPPENS     2,618,867
TOY FLYING DEVICE

Filed Nov. 30, 1949     3 Sheets-Sheet 1

INVENTOR.
Otto A. Coppens,
BY
Brown, Jackson,
Boettcher & Dienner
Attys.

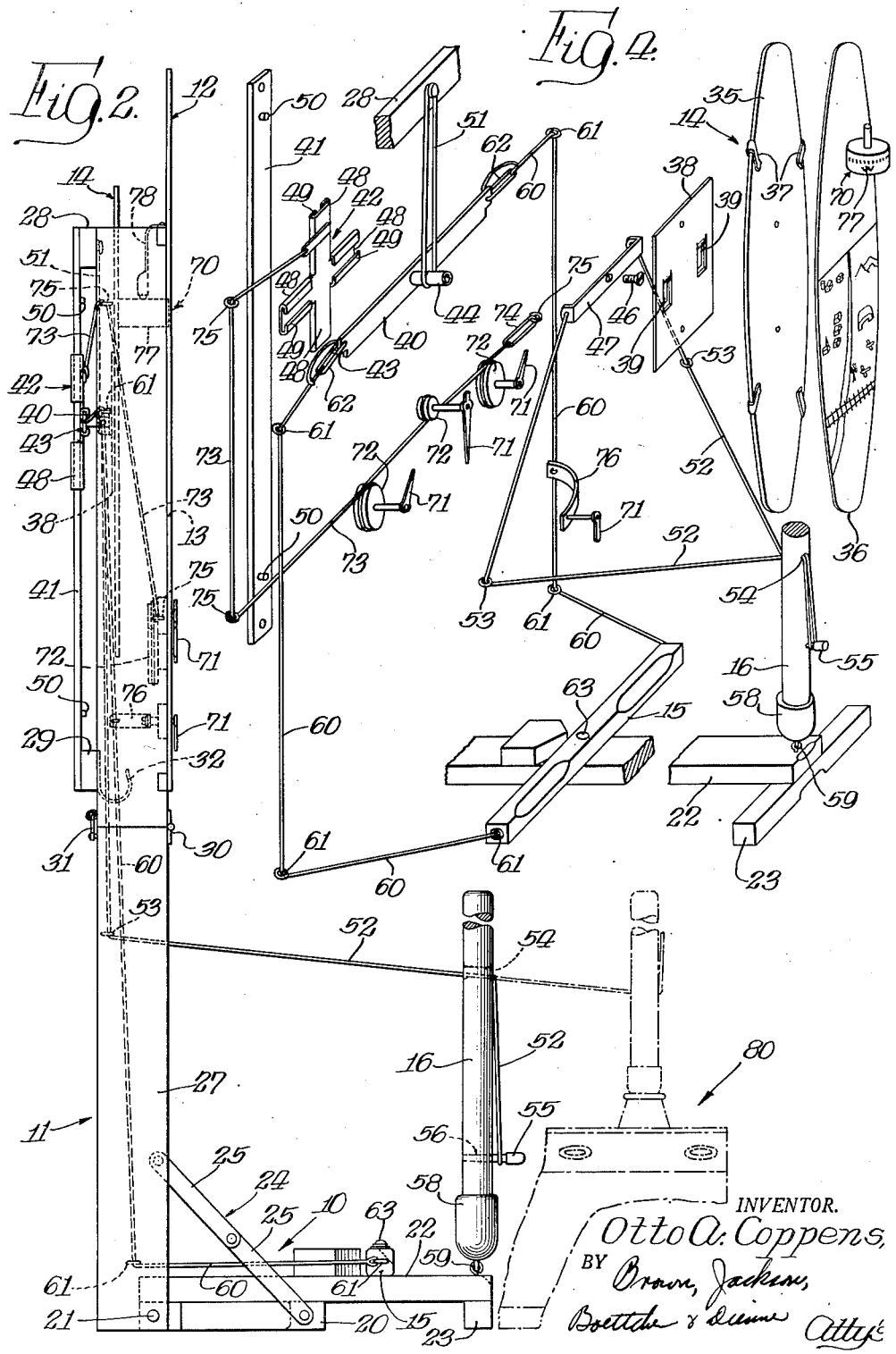

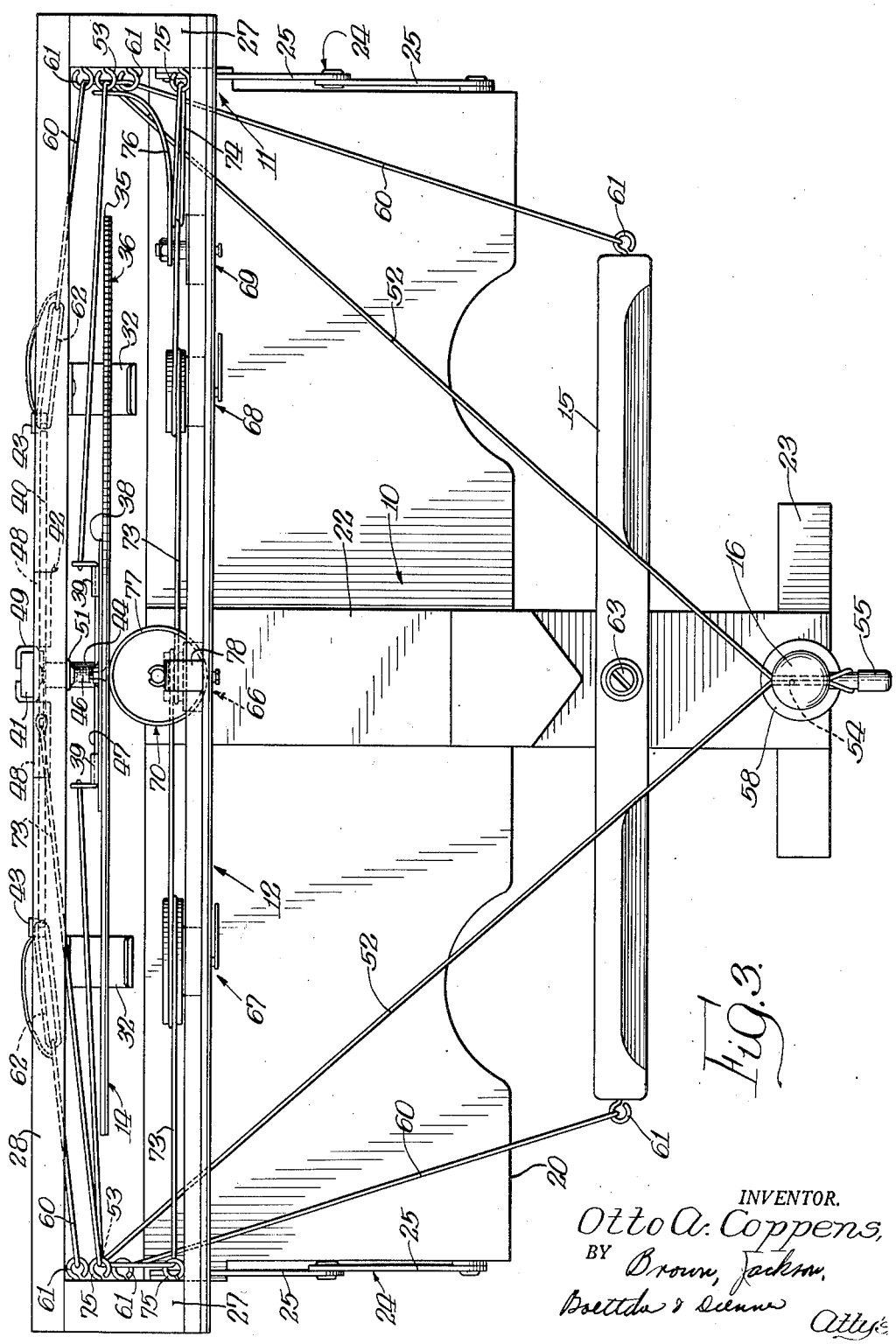

Patented Nov. 25, 1952

2,618,867

UNITED STATES PATENT OFFICE 2,618,867

TOY FLYING DEVICE

Otto A. Coppens, Highland Park, Ill.

Application November 30, 1949, Serial No. 130,321

5 Claims. (Cl. 35—12)

My invention is concerned with a new and useful toy flying device for the amusement and training of individuals interested in the rudiments of flying an airplane, and in particular my invention reveals a practice flying trainer of a type capable of being conveniently collapsed for storage and of a simple and light construction whereby it may be readily assembled for use in the home or public places without the need of any permanent installation.

Many indoor flight trainers have been introduced to the public in the past, the most famous of which is probably the Link trainer used by our Armed Forces. It is the general purpose of all such devices to make the teaching of the principles of flight, through the use of simulated flight conditions, possible while remaining on the ground; thereby avoiding the risk of actual flight to both pupil and instructor. The majority of such devices in the past have been rather complicated affairs with heavy, cumbersome and usually semi-permanent installations required. The small minority of flight teaching devices of a portable or collapsible nature have not, as a general rule, been too successful in presenting authentic conditions without becoming so complicated as to be beyond the understanding and financial means of the average child and home user.

It is one of the objects, then, of my invention to display a toy flying device or flight trainer that is both simple in construction and capable of being readily understood and operated by both young and old alike.

Another object of my invention is to provide a toy flight training device, collapsible in nature, whereby the device may be readily knocked down for storage or speedily assembled for use in the home or in public places.

It is a further object of my invention to present a toy flight training device in which the conditions and sensations of actual flight are accurately simulated while remaining on the ground.

It is a still further object of my invention to present a flight training device in which there is cooperation and coordination between the various flying controls and instruments of the simulated airplane whereby not only the thrills and amusement of the actual flight may be simulated but valuable and authentic flight training will be given the user.

These and further objects of my invention will appear from time to time as the following specification and description of my invention proceeds.

Now, in order to acquaint those familiar with this art as to the mode of constructing and using my invention, I shall describe a certain preferred embodiment thereof, with reference being had to the accompanying drawing wherein:

Figure 2 is a side elevation of the device shown in Figure 1;

Figure 3 is a top plan view of the device shown in Figure 1;

Figure 4 is an exploded perspective view showing the arrangement for assembly of the various parts of the movable flight view scene and its mode of operation.

Figure 1:
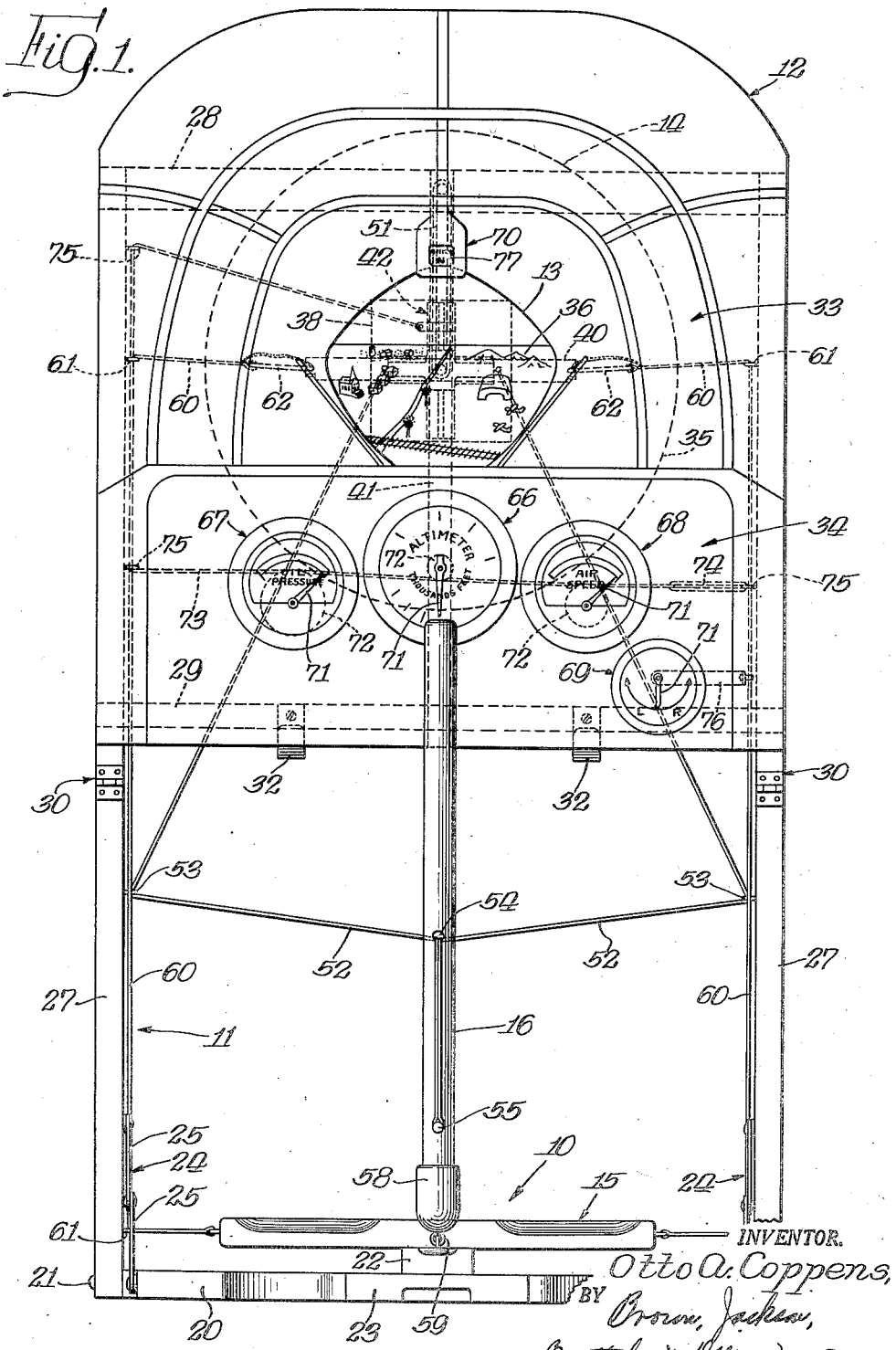
Figure 1 is a front elevation of a device made in accordance with my invention.

Referring now to Figures 1, 2 and 3 of the drawings, a toy flight trainer shown therein comprises a base 10, an upright supporting frame 11, having a simulated cockpit panel 12 mounted thereon, in which a simulated windshield opening 13 is centrally located and behind which a movable flight view scene 14 is mounted and controlled in its movements by a suitable rudder bar 15 and control stick 16 mountable on the base below and in front of the panel 12.

The base 10 may be of wood or light metal and comprises generally a horizontal cross piece 20 pivotally connected to the lower ends of the upright frame 11 by means of pivot pins 21. An additional base member 22 having a ground engaging foot 23 at one end thereof may be disposed at right angles to the cross piece 20 in central disposition therewith for supporting the control stick 16 and rudder bar 15. The cross piece normally lies flat on the ground at right angles to the upright frame 11, but is adapted to be folded upwardly inside the framing 11 for storage. Folding bracket 24 for bracing the cross piece 20 in its open position may extend angularly between the frame 11 and the base 10 and are shown herein as a common pivoted bar type of two links 25 pivotally joined together at one end and pivotally fastened to the frame and base at their free ends as shown in Figure 2.

The upright supporting frame 11 may be of wood, as shown herein, or of suitable light metal framing and includes generally a pair of parallel, laterally spaced, vertical side members 27 cross-connected by an upper cross bar 28 and an intermediate cross bar 29 for supporting the simulated cockpit panel 12. Any suitable fasteners, such as screws, nails or bolts, may be used to connect the various frame members together. Hinges 30 may be disposed about midway along the face of the side members 27 to allow the framing 11 to collapse for storage purposes. Catches 31 are mountable on the opposite side of the frame members 27 from the hinges 30 to lock them in their upright unfolded position. Bracket clips 32 may be mounted on the lower cross bar 29 to hold the control stick 16 for storage purposes.

The cockpit panel 12 may be of wood, cardboard, light metal or similar material and may have the interior view of an airplane or rocketship cockpit simulated thereon including a windshield portion 33 and an instrument panel 34. The opening 13 is disposed centrally of the panel 12 and near the lower portion of the windshield to provide visual access to the movable flight view scene assembly 14 mounted therebehind.

The movable flight view scene 13 comprises a light supporting circular disc member 35 of cardboard, plastic or the like to which a picture 36 of the horizon and sky as normally viewed from an airplane cockpit may be detachably mounted by suitable clips 37 or the like. Substituting various skyline pictures may be desirable and readily accomplished by clipping new scenes to the disc member to simulate various flight situations such as going through a mountain range, or coming into a landing field etc. A supporting plate 38, preferably of light gauge metal having a pair of clips 39, pressed therefrom may be mounted on the back of the disc members near its center, as shown in Figure 4, for purposes of mounting the view to the scene actuating mechanism.

The mechanism for actuating the movement of the flight view scene 14 relative to the cockpit panel 12 and opening 13 comprises chiefly a horizontal slide bar 40, a vertical slide bar 41 and a cross-shaped slide bracket 42 operatively connected with the rudder bar 15 and control stick 16 in a manner which will appear later herein. Looking at Figure 4 of the drawings, it will appear that the horizontal slide bar 40 is provided with a bent stop 43 projecting from each end thereof for limiting the free lateral movement of the bar 40. A projecting tapped cylindrical bearing 44 may be rigidly attached to the rectangular cross sectioned slide bar 40 near the center of one of its broad faces by suitable screw or rivet means. A bearing screw 46 may be provided to screw into the central tapped interior of the bearing 44 to hold a rotatable bar 47 thereto. A lock washer may be interposed between bar 47 and the end of bearing 44 around screw 46, which is normally threaded into bearing 44 a distance sufficient to allow the rotatable bar 47 to rotate through approximately 180°. The bar 47 may be angular in shape, and preferably of metal having a hole disposed appropriately near its center for receiving the bearing screw 46 therethrough. The rotatable bar 47 acts as the intermediate support to which the flight view scene assembly 14 is removably attached by means of the two clips 39 of the supporting plate 38.

The slide bracket 42 is preferably of metal and is cross shaped having four arms 48 with slide guides 49 projecting therefrom. It will be noted that the arms 48 which accommodate the vertical slide bar 41 have the guides 49 extending rearwardly therefrom, while the guides on the arms 48 for guiding the horizontal slide bar 40 project forward 180° in directional sense from the vertical slide bar guides mentioned above. This arrangement will allow sliding of the bars 40 and 41 in the bracket 42 without interference with one another. Free travel of the vertical slide bar 41 is limited by means of stops 50 mounted near opposite ends of the slide bar 41 and adapted to interfere with the slide bracket 42 to prevent the slide bar 41 from slipping through the guides. The vertical slide bar 41 is adapted to be mounted vertically on the upper cross bar 28 and the cross bar 29 of the frame 11 by means of any suitable fasteners such as screws to provide anchoring means for fastening the view actuating mechanism rigidly to the frame 11.

A spring or rubber band 51 may be attached between the upper cross bar 28 of the frame 11 and the cylindrical bearing 44 to provide yieldable means for drawing the bar 47 and the attached slide bracket 42 upwardly along the vertical slide bar to its upper limit of travel against stop 50. The rotatable bar 47 is connected to the control stick 16 by means of cables or light cords 52 run through suitable stationary guides 53, herein shown as common screw eyes, fastened near the lower reaches of the two upright frame side members 27. The cords 52 may pass through a hole 54 drilled near the middle of the control stick and be fastened thereto by a common peg 55 which is insertable in a suitable opening 56 located near the bottom of the control stick. The length of cords 52 is such that with the control stick in a vertical neutral position the movable scene 14 will be centered in opening 13 of the windshield 33. The control stick itself is removably inserted in a tapered socket 58 fastened to the base member 22 by means of a universal swivel joint 59 which allows the stick to pivotally move therearound.

The horizontal slide bar 40 may be operatively connected with the rudder bar 15 through cords 60 run through guides 61 similar to guides 49 and fastened to the upright frame member 27 below the middle section thereof. Springs 62 connect between the cords 60 and the ends of the slide bar 40, with preferably a small loop of cord shunted across the yieldable spring or rubber band 62 to provide a positive connective means to prevent exceeding the elastic limit of spring 62. The rudder bar 15 may be pivotally connected for horizontal rotational movement to the base members 22 by any suitable means, such as a pivot pin 63 as seen in Figure 4. Cords 60 are of a regulated equal length so that with the rudder bar in neutral position at right angles with base member 22 the scene will be laterally centered in the windshield opening 13.

If desired, the cockpit panel 12 may be provided with various gauges such as an altimeter 66, oil pressure gauge 67, and air speed indicator 68, turn indicator 69, compass 70 and others that will be actuated with the operation of the controls to simulate their various functions.

The oil pressure gauge, altimeter and air speed indicator may be actuated in response to the movement of the control stick in the following manner: Indicator pointers 71 may be rotatably mounted in the instrument panel 33 by any suitable rotatable shaft or bolt arrangement with sheave wheels 72 mounted thereon at the back side of the panel so that rotation of a sheave 72 will cause corresponding movement of an associated pointer 71. A cord or cable 73 anchored to a side member 27 of the frame 11 with a spring 74 connected between the cord and frame, and run through suitable guides 75, herein screw eyes, to connect with the cross shaped slide bracket 42, and wrapped around the sheaves 72 in a manner suitable to actuate the pointers 71 in the proper sense; will cause the gauges to register upon up or down movement of the flight view scene 14 as actuated by the control stick.

Fastening a pointer 71 of the turn indicator 69 to a flexible arm 76 by means of suitable shafting extending through the panel 12, and in turn fastening the flexible arm 76 directly to the cord 60 actuated by the rudder bar 15; will cause the turn indicator to register right or left as the rudder bar is actuated accordingly.

A compass indicator 70 may be actuated and simulated by providing a roller indicator 77 with the compass points inscribed thereon, and mountable to the upper cross bar 28 behind the windshield 33 by a suitable flexible bracket 78 in such a position that the roller indicator will contact the face of the circular flight view scene 14 so that as the disc 35 and picture 36 are rotated by the control stick and moved laterally by the rudder bar the compass indicator roller 77 will register a change in bearing.

Similarly the toy described above may be used optionally in conjunction with my audible pilot trainer 80 as revealed in my application Serial No. 713,127 filed November 29, 1946, and now abandoned, by inserting the control stick 16 in that device as is shown in phantom view in Figure 2 herein. The use of such an audible pilot trainer will give realism to the operation of my toy device shown herein by adding coordinated sound impressions simulating airplane noises to the visual illusions created by the moving flight view scene 14 herein.

Use and operation

Operation of the toy device described above is based on the optical illusion that if a moving scene is viewed from a stationary window or opening, the effect is similar to viewing a stationary scene from a moving window or opening. The opening as shown herein at 13 may represent an airplane cockpit view, or a space ship cockpit view or the like; the moving scene being coordinated with the movement of simulated flight controls, thus producing the illusion of flying an airplane.

In operation a person using my device preferably may be seated facing the cockpit panel, the control stick 16 being held by hand between the knees, and both feet resting on the rudder bar 15. By proper manipulation of the controls a simulated flight view producing the illusion of flying an airplane is produced and seen through the windshield opening 14. Various flight scenes may be substituted at will for variety. The coordinated operational characteristics of the simulated flight view scene 14, with the movements of the rudder bar and control stick operation as described above, are as follows:

When the control stick 16 is moved forward the spring or rubber band 51 draws the scene upwardly from its neutral centered position opposite opening 13 to simulate descent. Conversely when the stick is drawn back the cords 52 pull against the spring 51 and the scene moves downwardly along slide bar 41 to simulate ascent. A slight movement of the control stick to the left will cause the scene mechanism to rotate clockwise on bearing screw 46 to simulate left bank, and movement thereof to the right causes simulated right bank.

Pushing the rudder bar 15 forward by the left foot pulls slide bar 40 to the right by means of cords 60, shifting the attached scene to the right to simulate left turn. Likewise movement of the rudder bar forward by the right foot causes simulated right turn. In addition to the horizontal movement of the flight scene by the rudder bar 15, the scene also tends to rotate around bearing screw 46 to simulate adverse bank which may be corrected by proper operation of the control stick 16 to simulate correct bank.

The extent of the scene movements is governed by the extent of the control movements of the control stick and rudder bar, coordination of all movements being maintained within the limits of control travel as determined by the stops 43 and 50. It should be noted that at no time does the flight view scene 14 travel beyond the contour of the cockpit panel 12, nor does the periphery of the picture 36 ever come within the contour of the opening 13 in the windshield.

Thus it is seen that I have provided a novel and useful toy capable of producing enjoyment and valuable flight training through the coordinated movement of the flight view scene with the flight controls.

While I have herein displayed one preferred form in which the principles of my invention may appear, it will be readily understood that numerous changes, modification and substitution of equivalents may be employed without departing from the spirit and scope of my invention, and, therefore, I do not wish to be limited to the specific embodiments herein illustrated, except as may appear in the following appended claims.

I claim:

1. In a toy flying device adapted to produce the illusion of flying an airplane or the like, a stationary simulated cockpit panel mounted on an upright frame supported by a base, a movable simulated flight view scene comprising a supporting circular disc capable of having a variety of photographs of a typical flight view scene detachably mounted thereon, slidable supporting means detachably mounted to said disc comprising a slide bracket adapted to receive a horizontal slide bar and a vertical slide bar for sliding movement relative to said bracket, a control stick detachably mounted on said base for universal pivotal movement, a rudder bar mounted on said base in spaced relation to said control stick and adapted to move about a central pivot connection with said base in a horizontal plane, control cords connected between said control stick and the disc supporting means for actuating co-planar vertical and rotational movement of said disc and simulated flight view scene, and additional control cords connected between opposite ends of said rudder bar and said horizontal slide bar to actuate horizontal planar movement of said scene, whereby said scene may be moved in a single plane in coordinated response to pivotal movements of said control stick and rudder bar to simulate flight movements of said airplane.

2. In a toy flying device adapted to produce the illusion of flying an airplane or the like, a base for supporting an upright frame, a simulated cockpit panel having a mock instrument panel and windshield mounted on said frame, a disc, carrying pictorial representations of a flight scene, mounted behind said windshield and visible therethrough, hand and foot operated control means mounted on said base in front of said cockpit panel and connectively associated with said disc for controlling independent or simultaneous co-planar horizontal, vertical and rotative movement thereof in a single vertical plane behind and parallel to said panel; and a small cylindrical member, carrying representations of compass indicia, rotatably mounted on a vertical axis between said cockpit panel and said disc, said cylindrical member being visible through said panel and having its peripheral surface in contact with said disc whereby either rotational or horizontal movement of said disc will cause coordinated and responsive rotation of said cylindrical member to indicate simulated compass headings for said flying device with the compass headings being uneffected by vertical movement of said disc.

3. A portable toy flying device of the type adapted to instruct an individual in the principles of flying an airplane, comprising in combination, a horizontal supporting base member, an upright frame secured vertically to said base member, a simulated planar cockpit panel mounted across the upper reaches of said frame and having a central aperture therein simulating a pilot's cockpit field of vision, a horizontal foot operated rudder control bar pivotally mounted on said base in front of said panel for arcuate movement in a plane transverse to said panel, a manually operated, substantially vertical control stick pivotally mounted at its lower end to said base for universal pivotal movement, a planar disc, carrying pictorial representations of a flight scene, mounted behind and parallel to said panel and opposite said opening therein so as to be visible through the latter, a movable supporting means behind said disc for mounting the same, said supporting means permitting horizontal and vertical linear movement and clockwise and counterclockwise rotational movement of said disc, a first set of control cords connecting opposite ends of said rudder bar with said supporting means and adapted to effect horizontal translation of said disc in response to pivotal movement of said rudder bar, and a second set of control cords connecting an intermediate point on said control stick with said supporting means and adapted to effect vertical up and down movement of said disc when said control stick is moved arcuately in a vertical plane toward and away from said scene and additionally causing rotational movement of said disc when said control stick is moved out of said vertical plane of movement; all the movements of said disc being coplanar and capable of independent or simultaneous occurrence as desired.

4. The flying device as set forth in claim 3 wherein elastic members are connectively arranged between said control cords and disc supporting means and between said supporting means and said frame automatically for returning said controls, upon release thereof, to a position wherein said disc is positioned at substantially its upper limit of vertical travel with respect to said panel aperture thereby visually simulating said flying device's lowest altitude position.

5. In a toy flying device adapted to produce the illusion of flying an airplane or the like, a base for supporting an upright frame, a simulated cockpit panel, having a mock instrument panel and windshield mounted on said frame; a disc member, carrying pictorial representations of a flight scene, mounted behind said windshield and visible therethrough; hand and foot operated control means mounted on said base in front of said cockpit panel and connectively associated with said disc for controlling independent or simultaneous coplanar horizontal, vertical and rotative movement of said disc in a single vertical plane behind and parallel to said cockpit panel; a small cylindrical element carrying representations of compass indicia, rotatably mounted on a stationary vertical axis between said cockpit panel and said disc, said compass indicia being visible through said panel and said cylindrical element having its peripheral surface in contact with said disc whereby the extent of rotational movement of said cylindrical element in response to a degree of rotational movement of said disc depends on the variable vertical positioning of said disc relative to said cylindrical element, thus providing a means of variable progressive and regressive movement of said cylindrical element to bring a predetermined part of said indicia thereon in view by coordinated vertical, horizontal and rotational movements of said disc.

OTTO A. COPPENS.

REFERENCES CITED

The following references are of record in the file of this patent:

UNITED STATES PATENTS

| Number | Name | Date |
| --- | --- | --- |
| 1,797,794 | Rougerie | Mar. 24, 1931 |
| 1,831,939 | White | Nov. 17, 1931 |
| 2,307,840 | MacDonald | Jan. 12, 1943 |
| 2,312,370 | Soule | Mar. 2, 1943 |
| 2,332,218 | Harris | Oct. 19, 1943 |
| 2,352,101 | Hutter | June 20, 1944 |
| 2,374,401 | White | Apr. 24, 1945 |
| 2,385,095 | McCarthy | Sept. 18, 1945 |
| 2,409,238 | Barber | Oct. 15, 1946 |
| 2,453,436 | Hertz | Nov. 9, 1948 |

FOREIGN PATENTS

| Number | Country | Date |
| --- | --- | --- |
| 378,172 | Great Britain | Aug. 11, 1932 |